United States Patent [19]

Miller et al.

[11] 3,853,805

[45] Dec. 10, 1974

[54] SILICONE ELASTOMERIC MATERIAL

[75] Inventors: Darrow L. Miller, Los Angeles; David H. Kaelble, Thousand Oaks, both of Calif.

[73] Assignee: North American Rockwell Corporation, Los Angeles, Calif.

[22] Filed: Nov. 10, 1972

[21] Appl. No.: 305,409

[52] U.S. Cl. .............................. 260/37 SB, 260/825
[51] Int. Cl............................................ C08g 51/04
[58] Field of Search ........................ 260/37 SB, 825

[56] References Cited
UNITED STATES PATENTS

| | | | |
|---|---|---|---|
| 3,522,202 | 7/1970 | Wada et al...................... | 260/825 X |
| 3,696,090 | 10/1972 | Lampe............................ | 260/825 X |

FOREIGN PATENTS OR APPLICATIONS

| | | | |
|---|---|---|---|
| 909,052 | 10/1962 | Great Britain...................... | 260/825 |

*Primary Examiner*—Lewis T. Jacobs
*Attorney, Agent, or Firm*—Charles T. Silberberg; L. Lee Humphries

[57] ABSTRACT

Silicone elastomer materials particularly adapted for use as a matrix in acoustical coupling systems for coupling the sound from an acoustical transducer to the test object in ultrasonic nondestructive testing for flaws and discontinuities in a test object, and also having general utility for elastic airtight seals between metal or other surfaces, comprising the cured product of a mixture of three siloxane, preferably dimethyl siloxane, polymers having varying molecular weights, one of such polymers being a silicone elastomer having a molecular weight range of about 6,000 to about 10,000, a second siloxane polymer being in the form of a gel and having a molecular weigh ranging from about 170,000 to about 300,000, and a third component being a nonreactive siloxane polymer oil having a molecular weight ranging from about 1,500 to about 5,000, and which composition can optionally include a silica filler, such as fumed silica. The cured elastomer while being strong and tough, is soft and compliant and also readily wets the surface of the substrate, so that such elastomer readily conforms and adheres to rough as well as smooth surfaces, eliminating voids and air pockets, and is applicable to such surface with a minimum of external pressure to provide an airtight seal, and also being removable using a minimum of force.

29 Claims, No Drawings

SILICONE ELASTOMERIC MATERIAL

BACKGROUND OF THE INVENTION

This invention relates to the production of slicone elastomer materials, and is particularly concerned with the attainment of highly flexible yet strong and tough silicone elastomers which are very compliant and possess a superior wetting action, conferring thixotropic-like properties on such elastomer, and permitting such elastomer material to readily conform and adhere to both smooth and rough surfaces on an object, to provide a resilient airtight seal, by the application of substantially zero, or at least only a light pressure, in adhering the elastomer to the object surface, and requiring only a similar light force for removal of the elastomer.

Ultrasonic nondestructive testing of bodies such as metal parts has been developed. This is a method which utilizes UHF (ultra-high frequency) sound waves to detect discontinuities in parts. An ultrasonic testing device is employed, in which a probe or transducer is placed in contact with a surface of the part to be inspected. Ultrasonic waves are generated by applying a pulsed oscillating voltage from a pulser to a transducer (piezoelectric crystal). When the transducer is electrically excited and is adequately coupled to a part being inspected, an ultrasonic wave passes into the part. A change in acoustic properties of the part (surface and subsurface cracks, discontinuities, part surfaces, interfaces) reflects the wave back to the transducer. The reflected wave mechanically stresses the transducer and the transducer generates electrical charges. The electrical signals are applied to an amplifier circuit with the ultrasonic instrument, where they are amplified and displayed on a CRT (cathode-ray tube).

In the above procedure, a couplant is required to be applied to a surface of the object to be tested, to provide an effective medium for ultrasonic transmission between the transducer or probe applied to the surface of the body, and the body undergoing nondestructive testing. Thus, the primary purpose of couplants is to provide a suitable ultrasonic path between the transducer and part being inspected. Air is a poor conductor of ultrasonic energy. The couplant also fills in and smooths out irregularities of a part's surface.

The design considerations which largely determine the quality of acoustic dry couplants are largely determined by three factors: complete interfacial bonding under light contact forces; low spacial attenuation; and close impedance matching between the coupled elements. With respect to interfacial bonding, pressure sensitive adhesives display the easy bonding required of a dry coupling material, but hold too aggressively to the substrate for use as a couplant for ultrasonic nondestructive testing. Thus an efficient coupling material should exhibit the easy bonding properties of a pressure sensitive adhesive but display a complete lack of the aggressive holding properties thereof, so that debonding is accomplished with the same ease as bonding. The drycoupling medium should also possess the property of low spacial attenuation, that is exhibit only very low energy loss of ultrasonic energy transmitted through the couplant. Of particular significance, the couplant should serve as an acoustic impedance matching medium, the closer the couplant acoustic impedance matches that of the part being inspected, the better the ultrasonic wave transfer. An acoustic dry couplant system is disclosed in U.S. Pat. No. 3,663,842.

It is accordingly the chief object of the present invention to provide a strong tough yet highly flexible and compliant cured silicone elastomer matrix material which, although being essentially non-tacky, has a wetting action akin to exhibiting thixotropic characteristics providing substantially airtight sealing to a substrate surface substantially without the application of external forces, the thixotropic-like elastomer of the invention having the additional advantages and properties of being nontoxic, nonirritating to personnel, and being essentially noncontaminating, and bonding without picking up dirt or dust, and is particularly adapted for use as a matrix material in dry couplant systems for nondestructive ultrasonic testing, and also has general application for the provision of elastic airtight seals applied to various types of surfaces.

DESCRIPTION OF THE INVENTION

The above objects and advantages are achieved, according to the invention, by the provision of an elastomer obtained by curing a mixture of three essentially dimethyl polysiloxanes, each of such three polysiloxanes having a different molecular weight range and conferring the desired characteristics of strength and resistance to tearing, high flexibility and conformability to a part surface, and good wetting action of the cured elastomer to a part surface, so that the resulting soft compliant composition readily conforms to any shaped surface including rough and irregular surfaces, and also has the unique characteristic of wetting the surface of the substrate to eliminate voids and air pockets while providing a good airtight seal, simply by applying the elastomer to the part surface with substantially no application of external forces, or simply by its own weight, and permitting its removal by a similar very small force, the elastomer maintaining a relatively stable shape and leaving no residue on debonding.

In preferred practice, a filler material, preferably a fine powdered silica, and most desirably in the form of fumed silica, is mixed with the above three essential silicone elastomer components in providing the cured silicone elastomer which is particularly effective as an ultrasonic medium, to enhance the strength and toughness of the flexible and compliant cured elastomer material.

One of the three essential siloxane polymer components of the siloxane polymer mixture employed in producing the cured elastomer material of the invention is a silicone elastomer in the form of a curable dimethyl polysiloxane having a molecular weight ranging from about 6,000 to about 10,000, preferably about 7,000 to about 8,500, and an average of from about 1.9 to about 2.05 organic or hydrocarbon radicals per silicon atom. A particularly effective dimethyl polysiloxane of this type, having an average molecular weight of about 7,700, is the silicone elastomer marketed as Sylgard 186 by Dow Corning. Alternatively, curable methyl phenyl polysiloxanes also having a molecular weight within the above ranges, and having a ratio of methyl to phenyl groups of at least 8:1, can be employed in place of or in combination with dimethyl polysiloxane. These materials form the matrix of the cured silicone elastomer according to the invention, and confer particularly high tear strength, toughness and high elongation, as well as flexibility characteristics, upon the cured siloxane elastomer of the invention. This siloxane polymer component of the composition is generally employed in an amount ranging from about 20 to about 80 percent, preferably about 30 to about 60 percent, an optimum proportion being about 40 percent to about 45 percent, by weight of the composition.

The second siloxane polymer component employed in the invention composition is a curable dimethyl polysiloxane or a curable methyl phenyl polysiloxane having a methyl-to-phenyl ratio of at least 8:1, employed separately or in combination as noted above, and an average of from about 1.9 to about 2.05 organic or hydrocarbon radicals per silicon atom, but which has a high molecular weight, ranging from about 170,000 to about 300,000, preferably about 200,000 to about 250,000. This siloxane polymer component is generally in the form of a gel, a material of this type found particularly effective according to the invention being the dimethyl polysiloxane dielectric gel Sylgard No. 51 of Dow Corning, having an average molecular weight of about 230,000. This siloxane polymer gel component is generally employed in proportions ranging from about 20 to about 80 percent, preferably about 30 to about 60 percent, an optimum proportion being about 40 percent to about 45 percent by weight. As previously noted, this siloxane gel component functions to provide a soft, resilient, compliant cured elastomer, which readily takes the shape of any type of surface to which it is applied, to substantially completely fill any void in the surface, and substantially eliminate air pockets between the elastomer and the adjacent substrate surface.

A curing agent is required for curing the above-noted curable or reactive first and second polysiloxane components, which generally contain reactive end groups such as terminal hydroxy or alkoxy groups. Among the various curing agents which are well known in the art for this purpose are included ethyl silicate, ethyl polysilicate, and alkyl trialkoxy silanes, as represented by methyl triethoxy silane. Only a sufficient amount of the curing agent to react with, or cross-link, the end groups of the above-noted polysiloxanes is required, usually ranging from about 5 to about 15 percent, e.g. about 10 percent, of such curing agent by weight of the polysiloxanes to be cured. The use of excess curing agent is of no benefit and is uneconomical.

A catalyst is usually also required for controlling the curing rate of each of the above-noted reactive first and second polysiloxane components of the composition, with the above curing or cross-linking agents. Any suitable and known catalysts for this purpose can be employed such as tin or stannous soaps, e.g. stannous octoate and dibutyl tin dilaurate. The amount of catalyst employed will depend on the particular type of catalyst and the rate of reaction which is desired, for carrying out the curing reaction for the substantially complete cross-linking of the end groups of the siloxane polymer starting materials, that is the first and second components noted above, with the curing agent.

The catalysts also are employed in minor proportion based on the polysiloxane components to be cured, e.g. employing, as in the case of the curing agent, about 5 to about 15 percent, e.g. 10 percent, of the catalyst by weight of the polysiloxane components, that is, based on the total weight of the first and second siloxane polymers, to be cured.

The third essential siloxane polymer component is a dimethyl polysiloxane or a methyl phenyl polysiloxane having a ratio of methyl to phenyl groups of at least 8:1, employed separately or in combination, and an average of from about 1.9 to about 2.05 organic or hydrocarbon radicals per silicon atom. Such component however, is a nonreactive linear dimethyl siloxane polymer or nonreactive linear methyl phenyl siloxane polymer, containing no reactive groups. This material is in the form of a fluid or oil having a molecular weight ranging from about 1,500 to about 5,000, preferably about 1,800 to about 3,000, and can have a viscosity range e.g. of about 5 to about 1,000 centistokes at ambient temperature. A preferred siloxane polymer fluid of this type which has been found particularly useful in the invention composition is Dow Corning 200 Fluid, believed to comprise a dimethyl polysiloxane having an average molecular weight of about 2,500 and a viscosity of about 5 to about 10 centistokes at ambient temperature. Since this siloxane component or fluid contains no reactive groups, it is an inert fluid which takes no part in the curing or cross-linking reaction involving the above-noted first two polysiloxane components.

The above-noted third polysiloxane component or oil confers a wetting action on the cured flexible and compliant elastomer of the invention, causing the cured elastomer to readily wet any surface to which it is applied, substantially without the application of any external pressure, so that the resulting elastomer forms an extremely low pressure seal, that is it provides an airtight seal between the elastomer and an adjacent surface substantially without the application of any external force or simply by its own weight on the surface. However, although conferring a wetting action on the cured elastomer, such elastomer is essentially nontacky, and although the elastomer has good adherence to a surface to which it is applied, it can be readily removed by a slight peeling action, using essentially no more force in such removal, as was applied in adhering the cured elastomer to the substrate surface. The oil or fluid siloxane polymer component is believed also to have some effect in providing the cured elastomer with the above-noted flexibility and compliance characteristics as well as conferring the above-noted wettability characteristics. The term "thixotropic-like" employed herein as applied to the cured elastomer according to the invention, is meant to denote the unique property of the elastomer hereof for wetting the surface of a substrate and conforming to its surface characteristics, by the application of a minimum of pressure.

The siloxane polymer fluid component or oil is generally employed in minor proportion, usually in a proportion ranging from about 4 to about 20 percent, preferably about 5 to about 15 percent, by weight of the composition. If substantially more than about 20 percent of such siloxane polymer oil is employed, the strength characteristics of the polymer are seriously reduced, and the elastomer undesirably tends to bleed or exude this oil component when applied to a substrate surface. Use of substantially less than about 4 percent by weight of the oil component seriously reduces the important wettability and thixotropic-like characteristics of the elastomer.

In preferred practice, although not essential, there is incorporated in the mixture of siloxane polymer components noted above, a small amount of powdered silica (silicon dioxide) which renders the cured silicone elastomer tougher and stronger than in the absence of the silica, and increases the resistance of the elastomer to tearing. In addition, the silica functions as a processing aid and is added to the siloxane polymer component mixture to increase its viscosity. Generally, a fine powdered silica is employed, the preferred silica material for this purpose being the very fine particle size fumed silica, a representative silica of this preferred type being that marketed as Cab-O-Sil M-5 by Cabot Corporation. Such Cab-O-Sil has an enormous external area, one gram of Cab-O-Sil M-5 having about 400 square meters of surface area. Cab-O-Sil M-5 is a submicroscopic fire-dry fumed silica different in structure from precipitated silicas or silica gels. Although silica is the preferred filler component, other fillers alternatively can be employed, such as alumina, e.g. fumed alumina, talc, calcium carbonate, or the like. The filler, preferably silica component, when employed, is utilized in minor proportion, e.g. ranging from about 0.1 to about 5 percent, preferably about 0.2 to about 3 percent by weight of the composition.

In providing the starting material mixture to be cured to producing the elastomer material of the invention, the first component, that is the polysiloxane having a molecular weight range of about 6,000 to about 10,000, as represented by Sylgard 186, is mixed with curing agent and catalyst, forming an essentially gummy mass, designated mixture A. The second polysiloxane component, that is the gel component molecular weight ranging from about 170,000 to about 300,000, as represented by Sylgard No. 51, is then separately mixed with catalyst and curing agent, forming a soft fluid-like syrupy mass, designated mixture B. The third component, that is the dimethyl siloxane polymer oil, has incorporated therein the silica, preferably in the form of fumed silica as represented by Cab-O-Sil M-5, and this mixture is formed into a thin paste, designated mixture C. The second and third mixtures, B and C are stirred and formed into a fairly fluid solution, and the first mixture A is then mixed with the mixture of B and C, forming a final mixture or solution which is in the form of a syrupy mass. Although the above is a preferred mixing procedure, it will be understood that alternative methods of forming the mixture of components, for example by adding and mixing all of the materials together to form the final mixture, can be practiced.

The resulting mixture is then preferably evacuated, for example at 29 to 30 inches mercury, until boiling ceases and there is no further viscosity change. This step removes entrapped air. The resulting syrupy mixture is then placed in molds and cured for about one hour at 200°F. A higher temperature of cure can be practiced, if desired to obtain a faster cure. Curing can also be carried out at lower temperatures, e.g. at about 149°F for about 4 hours, or at ambient temperature. However, ambient temperature curing requires several days and usually is not desirable. Tackiness of the resulting silicone elastomer can be controlled by controlling the amount of cure. It is preferred according to the present invention that curing be substantially complete so that the elastomer exhibits essentially no tackiness. The cure elastomer results from the cross-linking of the above-noted first and second reactive siloxane polymer components by means of the above-noted curing agent, e.g. ethyl silicate, such cured first and second siloxane polymer components thus having a molecular weight between chemical cross-links approximately corresponding to the above-noted molecular weight ranges for these respective first and second siloxane polymer components. The third inert or nonreactive siloxane polymer component or oil remains substantially in its initial form in the cured elastomer. When powdered or fumed silica is employed, the silica particles are substantially uniformly dispersed in the cured elastomer.

As pointed out above, the resulting cured silicone elastomer has high flexibility and is highly compliant, while having excellent strength and toughness. In addition, and of particular significance, the resulting elastomer possesses the above-noted thixotropic-like properties which permits the elastomer to wet the surface of an object and expel the interfacial air layer and avoid air pockets. Thus, the elastomer can be readily applied to the surface of an object in an airtight manner without the application of external forces. The thixotropic-like surface of the elastomer is noncontaminating non-toxic and nonirritating, and such wetting or thixotropic-like action is retained by the elastomer over a wide temperature range of from about −40°F to in excess of 400°F.

The wetting and sealing action of the elastomer of the invention particularly permits wide application of the elastomer. A particularly important application is its above-mentioned application as an extremely low pressure seal suitable for a matrix in acoustical coupling systems. Although the invention elastomer may be employed per se as a couplant medium, in order to obtain effective coupling, fine metal or siliceous powders such as aluminum or glass powder, are dispersed in the silicone elastomeric material or matrix hereof to adjust the acoustic impedance of the cured elastomer as described in above U.S. Pat. No. 3,663,842. For this purpose such fine powders can be added to the elastomer composition prior to curing, as described in this patent. Other applications of the elastomer of the invention include use of the flexible compliant elastomer as airtight seals, e.g. as aircraft window seals, and as airtight seals for all types of containers, and permitting quick and easy removal of the seals without application of any substantial force or peeling action. A thin layer of the elastomer will adhere to rough surfaces without any air pockets. The elastomer can be used as a seal on all types of surfaces, including metal, glass, plastic, ceramic and the like. Thus the elastomer possesses both easy bonding and easy release characteristics and bonds like pressure sensitive tape but can be removed with the same small force required in the initial bonding, whereas pressure sensitive tape requires an essentially greater force for release than for bonding.

The following are examples of practice of the invention, the amounts being expressed in parts by weight unless otherwise indicated.

EXAMPLE 1

Ten parts of dimethyl polysiloxane elastomer, Sylgard 186, having an average molecular weight of about 7,700, were mixed with 1 part of ethyl silicate curing agent and about 1 part of stannous octoate catalyst, and the resulting mixture, designated mixture A, was stirred, forming a gummy mass. Ten parts of dimethyl polysiloxane, having an average molecular weight of about 230,000, the dielectric gel Sylgard No. 51, was mixed with 1.2 parts of ethyl silicate curing agent and 1 part of stannous octoate catelyst, and the resulting mixture, designated mixture B, is formed into a fluid-like syrupy mass. A third mixture of 5 parts of dimethyl polysiloxane oil having an average molecular weight of about 2,500 and a viscosity of 5 to 10 centistokes, Dow Corning 200 Fluid, was mixed with 0.7 part of fumed silica, Cab-O-Sil M-5, and the resulting mixture, designated mixture C, was stirred to form a homogeneous suspension of the fumed silica particles in the oil.

Mixtures B and C were added together and stirred, providing a fairly fluid solution. Mixture A was then added to the mixture of B and C and the final solution of all three of the essential siloxane polymer components formed a syrupy mass. It is noted that this mass of the three essential components was uniform, and homogeneous, all three of the basic polysiloxane components being cosoluble with no tendency toward separation of any of such components from the solution or mixture of the components.

The resulting solution was evacuated at 29 inches of mercury until boiling ceased, and no further change in viscosity occurred. This insured removal of all air and the absence of voids in the resulting elastomer.

The resulting syrupy mixture was then placed in a mold and cured for about 1 hour at about 200°F.

Following curing, the resulting elastomer was removed from the mold, and such elastomer was observed to be highly flexible and compliant, and when applied to the surface of a metal object readily wetted the object and adhered thereto without any force. Following application, the elastomer was readily removable ty a very slight peeling action, from the surface of the metal object.

EXAMPLE 2

The procedure of Example 1 was carried out for producing the cured elastomer except that the fumed silica was omitted from mixture C.

The cured elastomer had substantially the same properties as the elastomer of Example 1, except that its tear strength was not as great as that of the elastomer of Example 1.

EXAMPLES 3-9

Elastomer mixtures corresponding to those listed in the table below were prepared according to the procedure of Example 1.

In each of the compositions corresponding to Examples 3-9 of the table, the curing agent was ethyl polysilicate and the catalyst stannous octoate, such curing agent and catalyst being employed in the same proportions with respect to the curable dimethyl polysiloxanes, Sylgard 186 and Sylgard 51, as were employed in Example 1.

| EXAMPLES (parts by weight) | | | | | | | |
|---|---|---|---|---|---|---|---|
| | 3 | 4 | 5 | 6 | 7 | 8 | 9 |
| Sylgard 186 | 10 | 27 | 27 | 54 | 45 | 30 | 55 |
| Sylgard 51 | 10 | 54 | 54 | 27 | 45 | 55 | 30 |
| Dow Corning 200 Fluid | 3 | 10 | 10 | 15 | 4 | 15 | 10 |
| Cab-O-Sil | — | 2 | — | 1.5 | 2 | 2 | 1.5 |

Upon curing the elastomer compositions of each of the Examples 3-9 above, a highly flexible and compliant cured elastomer was formed having good strength and tear resistance, and having thixotropic-like properties of wettability.

The cured elastomers of Examples 1-9 have utility as airtight window seals for aircraft.

EXAMPLE 10

The procedure of Example 1 was repeated employing as the first polysiloxane elastomer component a methyl phenyl polysiloxane having a methyl-to-phenyl ratio of 9:1, and an average molecular weight of about 9,000, and employing as the second silicone gel component a methyl phenyl polysiloxane having a ratio of methyl-to-phenyl groups to 9:1, and an average molecular weight of about 200,000, and utilizing dibutyl tin dilaurate as catalyst and methyl triethoxy silane as curing agent, all in the same proportions as employed in Example 1. Also, curing of the mixture of components was carried out at 149°F for about four hours.

The resulting cured elastomer was highly flexible and compliant, of good strength and tear resistance and had thixotropic-like wettable properties similar to the elastomer of Example 1.

EXAMPLE 11

The procedure of Example 1 was followed except that in place of Sylgard 186, a methyl phenyl polysiloxane having a ratio of methyl-to-phenyl groups of about 10:1 was employed.

A cured elastomer was obtained which was highly flexible and highly compliant, and had thixotropic-like properties, with good strength and tear resistance, the cured elastomer being useful as an airtight sealant for the cover of a container.

By incorporating fine metal or siliceous powders, such as aluminum, copper, nickel or glass powder, into the siloxane polymer compositions of Examples 1-11 prior to curing said compositions, in accordance with the disclosure of U.S. Pat. No. 3,663,842, the resulting cured elastomers function effectively as a couplant between a transducer and an object being tested in an ultrasonic testing procedure, the resulting elastomers containing such powders having substantially the same properties with respect to strength, flexibility, compliance and wettability, as in the absence of such powders.

From the foregoing, it is seen that the invention provides a novel mixture or composition comprising three selected polysiloxane components, preferably in combination with a filler, most desirably silica, which upon suitable curing, forms a novel cured silicone elastomer which has unexpected and advantageous properties including high conformability to any type of surface and thixotropic-like or wettable characteristics permitting good adherence to the object surface without application of external pressure, as well as easy removal therefrom as desired, and which maintains such properties over a wide temperature range, and which in addition is noncontaminating, nontoxic and nonirritating.

Various modifications and adaptations of the invention will occur to those skilled in the art and can be resorted to without departing from the spirit and scope of the invention, and hence the invention is not to be

We claim:

1. A strong, highly flexible and compliant cured silicone elastomer having wettability characteristics with respect to the surface of a substrate, comprising a cured mixture of (a) a first siloxane polymer selected from the group consisting essentially of a curable dimethyl polysiloxane and a curable methyl phenyl polysiloxane having a ratio of methyl to phenyl groups of at least 8:1, said first siloxane polymer having a molecular weight ranging from about 6,000 to about 10,000, (b) a second siloxane polymer selected from the group consisting essentially of a curable dimethyl polysiloxane and a curable methyl phenyl polysiloxane having a ratio of methyl to phenyl groups of at least 8:1, said second siloxane polymer having a molecular weight ranging from about 170,000 to about 300,000, and (c) a third siloxane polymer selected from the group consisting essentially of a nonreactive linear dimethyl polysiloxane and a nonreactive linear methyl phenyl polysiloxane having a ratio of methyl to phenyl groups of at least 8:1, said third siloxane polymer having a molecular weight ranging from about 1,500 to about 5,000; said mixture containing about 30 to about 60% of said first siloxane polymer, about 30 to about 60% of said second siloxane polymer and about 4 to about 20% of said third siloxane polymer, by weight.

2. A cured silicone elastomer as defined in claim 1, said first siloxane polymer having a molecular weight ranging from about 7,000 to about 8,500, said second siloxane polymer having a molecular weight ranging from about 200,000 to about 250,000, and said third siloxane polymer having a molecular weight ranging from about 1,800 to about 3,000.

3. A cured silicone elastomer as defined in claim 1, each of said first, second and third siloxane polymers being a dimethyl polysiloxane.

4. A cured silicone elastomer as defined in claim 2, each of said first, second and third siloxane polymers being a dimethyl polysiloxane.

5. A cured silicone elastomer as defined in claim 1, said mixture containing about 5 to about 15 percent of said third siloxane polymer, by weight.

6. A cured silicone elastomer as defined in claim 4, said mixture containing about 5 to about 15 percent of said third siloxane polymer, by weight.

7. A cured silicone elastomer as defined in claim 1, said mixture including powdered silica.

8. A cured silicone elastomer as defined in claim 1, said mixture including about 0.5 to about 5 percent powdered silica, by weight.

9. A cured silicone elastomer as defined in claim 7, each of said first, second and third siloxane polymers being a dimethyl polysiloxane.

10. A cured silicone elastomer as defined in claim 6, said mixture including about 0.2 to about 3 percent fumed silica, by weight.

11. A cured silicone elastomer as defined in claim 1, each of said first, second and third siloxane polymers being a dimethyl polysiloxane, said first siloxane polymer having an average molecular weight of about 7,700, said second siloxane polymer having an average molecular weight of about 230,000, and said third siloxane polymer having an average molecular weight of about 2,500, and being present in an amount ranging from about 5 to about 15 percent, by weight, said mixture including about 0.2 to about 3 percent of powdered silica, by weight.

12. A cured silicone elastomer as defined in claim 11, said first siloxane polymer being present in an amount ranging from about 40 to about 45 percent, said second siloxane polymer being present in an amount ranging from about 40 to about 45 percent, said first, second and third siloxane polymers containing about 1.9 to about 2.05 hydrocarbon radicals per silicon atom, and said powdered silica being fumed silica.

13. A curable composition for producing a strong, highly flexible and compliant cured silicone elastomer having wettability characteristics with respect to the surface of a substrate, comprising, by weight, (a) about 30 to about 60 percent of a first siloxane polymer selected from the group consisting essentially of a curable dimethyl polysiloxane and a curable methyl phenyl polysiloxane having a ratio of methyl to phenyl groups of at least 8:1, said first siloxane polymer having a molecular weight ranging from about 6,000 to about 10,000, (b) about 30 to about 60 percent of a second siloxane polymer in the form of a gel, selected from the group consisting essentially of a curable dimethyl polysiloxane and a curable methyl phenyl polysiloxane having a ratio of methyl to phenyl groups of at least 8:1, said second siloxane polymer having a molecular weight ranging from about 170,000 to about 300,000, and (c) about 4 to about 20 percent of a third siloxane polymer in the form of an oil, selected from the group consisting essentially of a nonreactive linear dimethyl polysiloxane and a nonreactive linear methyl phenyl polysiloxane having a ratio of methyl to phenyl groups of at least 8:1, said third siloxane polymer having a molecular weight ranging from about 1,500 to about 5,000.

14. A curable composition as defined in claim 13, said composition including about 0.1 to about 5 percent powdered silica, by weight.

15. A curable composition as defined in claim 13, said composition including a curing agent for said first and second siloxane polymers, and a catalyst for said curing reaction.

16. A composition as defined in claim 15, each of said first, second and third siloxane polymers being a dimethyl polysiloxane, and employing about 5 to about 15 percent of said curing agent and about 5 to about 15 percent of said catalyst, by weight, based on the total weight of said first and said second curable siloxane polymers.

17. A composition as defined in claim 15, said composition including about 0.1 to about 5 percent powdered silica, by weight.

18. A composition as defined in claim 16, said composition containing about 0.2 to about 3 percent fumed silica, by weight.

19. A composition as defined in claim 16, said curing agent being selected from the group consisting essentially of ethyl silicate, ethyl polysilicate and methyl triethoxy silane, and said catalyst being selected from the group consisting essentially of stannous octoate and dibutyl tin dilaurate.

20. A composition as defined in claim 17, said curing agent being selected from the group consisting essentially of ethyl silicate, ethyl polysilicate and methyl triethoxy silane, and said catalyst being selected from the group consisting essentially of stannous octoate and dibutyl tin dilaurate.

21. A composition as defined in claim 13, each of said first, second and third siloxane polymers being a dimethyl polysiloxane, said first siloxane polymer having an average molecular weight of about 7,700, and being present in an amount ranging from about 40 to about 45 percent, by weight, said second siloxane polymer having an average molecular weight of about 230,000, and being present in an amount ranging from about 40 to about 45 percent, by weight, and said third siloxane polymer having an average molecular weight of about 2,500, and being present in an amount ranging from about 5 to about 15 percent, by weight, and about 5 to about 15 percent by weight, based on the total weight of said first and said second curable siloxane polymers, of a curing agent selected from the group consisting essentially of ethyl silicate, ethyl polysilicate and methyl triethoxy silane, and about 5 to about 15 percent by weight, based on the total weight of said first and said second curable siloxane polymers, of a catalyst selected from the group consisting essentially of stannous octoate and dibutyl tin dilaurate.

22. A composition as defined in claim 21, said second siloxane polymer being present in an amount ranging from about 40 to about 45 percent, said first, second and third siloxane polymers containing about 1.9 to about 2.05 hydrocarbon radicals per silicon atom, and said powdered silica being fumed silica.

23. A strong, highly flexible and compliant cured silicone elastomer having wettability characteristics with respect to the surface of a substrate, comprising (a) a cured first siloxane polymer selected from the group consisting essentially of a dimethyl polysiloxane and a methyl phenyl polysiloxane having a ratio of methyl to phenyl groups of at least 8:1, said first siloxane polymer having a molecular weight ranging from about 6,000 to about 10,000 between chemical cross links, (b) a cured second siloxane polymer selected from the group consisting essentially of a dimethyl polysiloxane and a methyl phenyl polysiloxane having a ratio of methyl to phenyl groups of at least 8:1, said second siloxane polymer having a molecular weight ranging from about 170,000 to about 300,000 between chemical cross links, and (c) a third siloxane polymer selected from the group consisting essentially of a nonreactive linear dimethyl polysiloxane and a nonreactive linear methyl phenyl polysiloxane having a ratio of methyl to phenyl groups of at least 8:1, said third siloxane polymer having a molecular weight ranging from about 1,500 to about 5,000; said elastomer containing about 30 to about 60 percent of said first siloxane polymer, about 30 to about 60 percent of said second siloxane polymer and about 4 to about 20 percent of said third siloxane polymer, by weight.

24. A cured silicone elastomer as defined in claim 23, including silica particles substantially uniformly dispersed in said cured elastomer.

25. A cured silicone elastomer as defined in claim 23, each of said first, second and third siloxane polymers being a dimethyl polysiloxane.

26. A cured silicone elastomer as defined in claim 23, including about 0.5 to about 5 percent by weight of powdered silica particles substantially uniformly dispersed in said cured elastomer.

27. A cured silicone elastomer as defined in claim 23, said elastomer containing about 5 to about 15 percent of said third siloxane polymer, by weight.

28. A cured silicone elastomer as defined in claim 25, said elastomer containing about 5 to about 15 percent of said third siloxane polymer, by weight.

29. A cured silicone elastomer as defined in claim 28, said elastomer including about 0.2 to about 3 percent fumed silica, by weight.

* * * * *